(12) United States Patent
Gloanec et al.

(10) Patent No.: US 11,928,454 B2
(45) Date of Patent: Mar. 12, 2024

(54) METHOD FOR MANAGING EQUIPMENT IN ORDER TO UPDATE A FIRMWARE

(71) Applicant: Orange, Paris (FR)

(72) Inventors: Simon Gloanec, Châtillon (FR); Hervé Marchand, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 70 days.

(21) Appl. No.: 17/287,913

(22) PCT Filed: Oct. 4, 2019

(86) PCT No.: PCT/FR2019/052356
§ 371 (c)(1),
(2) Date: Apr. 22, 2021

(87) PCT Pub. No.: WO2020/084216
PCT Pub. Date: Apr. 30, 2020

(65) Prior Publication Data
US 2021/0397434 A1    Dec. 23, 2021

(30) Foreign Application Priority Data

Oct. 26, 2018    (FR) .................................... 1859912

(51) Int. Cl.
*G06F 8/65*          (2018.01)
*H04L 41/082*        (2022.01)
(52) U.S. Cl.
CPC .............. *G06F 8/65* (2013.01); *H04L 41/082* (2013.01)
(58) Field of Classification Search
CPC ........................................................ G06F 8/65
See application file for complete search history.

(56) References Cited

U.S. PATENT DOCUMENTS

| 2005/0186952 A1 | 8/2005 | Kitajima |
| 2008/0233943 A1* | 9/2008 | Okita .................... G06F 8/65 |
| | | 455/419 |
| 2014/0286354 A1 | 9/2014 | Van De Poel et al. |
| 2018/0189046 A1* | 7/2018 | Kunisetty .......... G06F 11/2289 |

FOREIGN PATENT DOCUMENTS

WO    WO 2006/131077    12/2006

OTHER PUBLICATIONS

International Search Report and Written Opinion dated Jan. 17, 2020 for Application No. PCT/FR2019/052356.

* cited by examiner

*Primary Examiner* — Duy Khuong T Nguyen
(74) *Attorney, Agent, or Firm* — Knobbe, Martens, Olson & Bear, LLP

(57) ABSTRACT

A method is described for remotely managing a piece of network connection equipment in order to deploy a firmware. The method includes generating connection data of the equipment to the network over a predetermined period of time, determining, on a remote management server, a time slot, specific to the equipment, for downloading the firmware depending on these the generated connection data, transmitting, to the equipment, information relating to the time slot specific to this equipment and to an address of a download server, sending, from the equipment, a request for downloading the firmware to the download server, sending, from the download server, firmware download data to the equipment, and downloading the firmware during the time slot specific to the equipment.

14 Claims, 1 Drawing Sheet

METHOD FOR MANAGING EQUIPMENT IN ORDER TO UPDATE A FIRMWARE

RELATED APPLICATIONS

This application is the U.S. National Phase of Application No. PCT/FR2019/052356 entitled "METHOD FOR MANAGING EQUIPMENT IN ORDER TO UPDATE A FIRMWARE" and filed Oct. 4, 2019, which claims the benefit of French Patent Application No. 1859912, filed Oct. 26, 2018, each of which is incorporated by reference in its entirety.

The field of the invention relates to the deployment of a firmware update within an equipment for connection to a network, for example a router. The network is for example a wide area network of Internet type.

To allow a customer or business to connect to a network and, thus, to access the content available on this network, an operator provides the customer or business with one or more equipments for connection to the network. These equipments, better known by the acronym CPE ("Customer-Premises Equipment" or "Customer-Provided Equipment") are then sited near the customer or business and are connected to the operator's infrastructure in a point of presence (also known by the acronym PoP) via a local loop.

The operator is responsible for the management and administration of an often large number of these equipments. In particular, the monitoring of these equipments may involve updating the firmware implemented in these equipments. This monitoring is additionally provided by a management server, also called an auto-configuration server. However, updating the equipments makes them unavailable during the download period. Thus, during the updating of the firmware of an equipment, the customer or business provided with this equipment does not have the possibility to access the accessible content on the network and therefore has to wait for the update to finish. To avoid these inconveniences, operators often choose to schedule these updates at night in the shortest possible time slot, hence in a period when an equipment is least likely to be required.

However, as explained above, an operator manages a large number of equipments so that updating them simultaneously leads to a high load on the servers. Operators are therefore forced to size the servers to be able to address the constraint of a fixed update download time slot common to all of the equipments.

Furthermore, a fixed time slot is independent of the habits and practices of the users of these equipments, so that some users, who sometimes need to connect to the network during this time slot, cannot then access the network due to the update.

The present invention aims to improve the situation.

To that end, a method is proposed for remotely managing a set of at least one equipment for connection to a network with a view to updating firmware within each equipment. The method is implemented by computing means and comprises:
generating, at the level of each equipment, data on the connection of the equipment to the network over a predetermined period of time,
determining, at the level of a remote management server, a time slot, specific to each equipment, for updating the firmware, the time slot specific to an equipment being dependent at least on the data on the connection of the equipment,
transmitting, to each equipment, information relating to the time slot specific thereto,
transmitting, to each equipment, information relating to an address of a download server with a view to updating the firmware within each equipment,
sending, from each equipment, a request to download the firmware update to the download server associated with the received address,
sending, from the download server, firmware update download data to each equipment sending a download request, and
downloading, within each equipment receiving the download data, the firmware update in the time slot specific to each equipment.

Determining a time slot for downloading the update specific to the network connection equipment makes it possible to decrease the load on the download server. Thus, the updating of the respective firmwares of the numerous equipments may be spread out over time so that the capacities of the download server are less stretched. Additionally, determining a time slot specific to each equipment makes it possible to personalize the firmware update procedure and, advantageously, to mobilize the equipment only in a time slot during which the equipment is usually used little or not at all by a user.

According to one aspect of the invention, the connection data generated by an equipment are transmitted at regular time intervals to the management server, each time interval corresponding to the predetermined period of time.

Alternatively, the connection data generated by an equipment during a plurality of predetermined periods of time are associated with a profile at the level of the equipment, the profile being selected in a memory storing profiles that are predetermined then transmitted to the management server.

Such an embodiment makes it possible to avoid multiplying the exchanges between the equipment and the management server and thus to avoid overloading the network. Specifically, in such an alternative, the data on the connection of an equipment are directly used by this equipment and placed opposite predetermined profiles within a memory. The obtained profile is then sent to the management server, which then directly obtains information on the periods of high/low consumption of the equipment with which the profile is associated.

According to one aspect of the invention, the transmission to an equipment of the information relating to the address of the download server is consecutive to the transmission, from the equipment, of a request to open a session to the management server, the request to open a session being sent upon detection, by the equipment, of the start of the time slot specific to the equipment.

According to another aspect of the invention, the one or more equipments and the management server communicate according to the TR-069 communication protocol. The connection data are for example transmitted to the management server in an "inform request" of the TR-069 protocol.

According to another aspect of the invention, the connection data generated at the level of an equipment relate to one or more times of connection of the equipment to the network during the predetermined period of time.

According to another aspect of the invention, the connection data generated at the level of an equipment relate to a quantity of data received by the equipment from the network during the predetermined period of time.

According to one embodiment, the time slot specific to an equipment is determined according to the capacities of the download server S_DWL relating to a maximum data transmission rate of the download server S_DWL.

According to another aspect of the invention, the set of at least one equipment comprises at least two equipments, the time slot specific to one equipment being further determined according to the data on the connection of the one or more other equipments.

Very often, a plurality of equipments, present at different customers' premises, have to be updated remotely. The multiplication of equipments leads, in the prior art, to a substantial load on the download server, which therefore has to be sized accordingly. In the context of the present invention, each equipment is allocated a time slot which is specific thereto for downloading the update. Nevertheless, it may happen that a plurality of equipments share, at least in part, a time slot such that the load on the download server may be increased over the periods of time in question, in particular when the download time slots overlap. It is therefore advantageous, in order to determine the download time slot assigned to a particular equipment, to take into account not only the data on the connection of this equipment but also the data on the connection of the other equipments (or of the other equipment in the case where only two equipments are considered in all).

In one or more embodiments, the determination of the time slot for updating the firmware specific to each equipment comprises:
- calculating, for each equipment and for each time slot of a plurality of potential time slots, a value of a parameter representative of a use of the equipment in the time slot in question according to the connection data generated by the equipment,
- selecting, for each equipment, the time slot corresponding to the lowest use of the equipment, the set of the selected time slots forming a schedule for updating all of the equipments,
- determining, at each time of a plurality of times of the schedule, an index representative of potential demand for the download server at said time, the index in question being dependent on the respective values of selected time slots comprising said time, and
- when the index is higher than a predetermined threshold at a given time of the schedule, replacing one of the time slots comprising the given time with another time slot, this other time slot being selected according to the value of the parameter representative of a use of the equipment in question in this other time slot.

According to one aspect of the invention, the value of the parameter representative of a use of an equipment in a given time slot is calculated according at least to the quantity of data received by the equipment in the time slot.

The invention further relates to a computer program comprising instructions for implementing the above method, when the instructions are executed by at least one processor.

Furthermore, the invention also relates to an equipment for connection to a network comprising a firmware, the equipment further comprising a processor and a communication module configured for:
- generating data on the connection of the equipment to the network over a predetermined period of time,
- receiving information relating to a time slot, specific to the equipment, for downloading a firmware update within the equipment,
- receiving information relating to an address of a download server with a view to downloading the firmware update,
- sending a request to download the firmware update to the download server associated with the received address,
- receiving, from the download server, firmware update download data, and
- downloading the firmware update in the time slot specific to the equipment.

The invention also relates to a remote management server for remotely managing a set of at least one equipment for connection to a network with a view to updating a firmware within each equipment. The management server is configured for:
- receiving, from each equipment, data on the connection of the equipment to the network over a predetermined period of time,
- determining a time slot, specific to each equipment, for updating the firmware, the time slot specific to an equipment being dependent at least on the data on the connection of the equipment,
- transmitting, to each equipment, information relating to the time slot specific to the equipment, and
- transmitting, to each equipment, information relating to an address of a download server with a view to downloading the firmware update within each equipment in the time slot specific to each equipment.

Lastly, the invention relates to a system comprising a set of at least one equipment for connection to a network such as described above and a remote management server for remotely managing the set of at least one equipment for connection to a network such as described above.

According to one aspect of the invention, the system further comprises a download server configured for, upon receiving a request to download the firmware update sent by an equipment of the set of at least one equipment, sending firmware update download data to said equipment.

Other features, details and advantages of the invention will become apparent from reading the following detailed description, and from analyzing the appended drawings, in which:

FIG. 1 illustrates a system SYS according to the invention.

The system SYS comprises an equipment CPE for connection to a network RES, a remote management server, also called an auto-configuration server, S_GES for remotely managing a set of at least one equipment, here just the equipment CPE, and a download server S_DWL.

Figure 1:
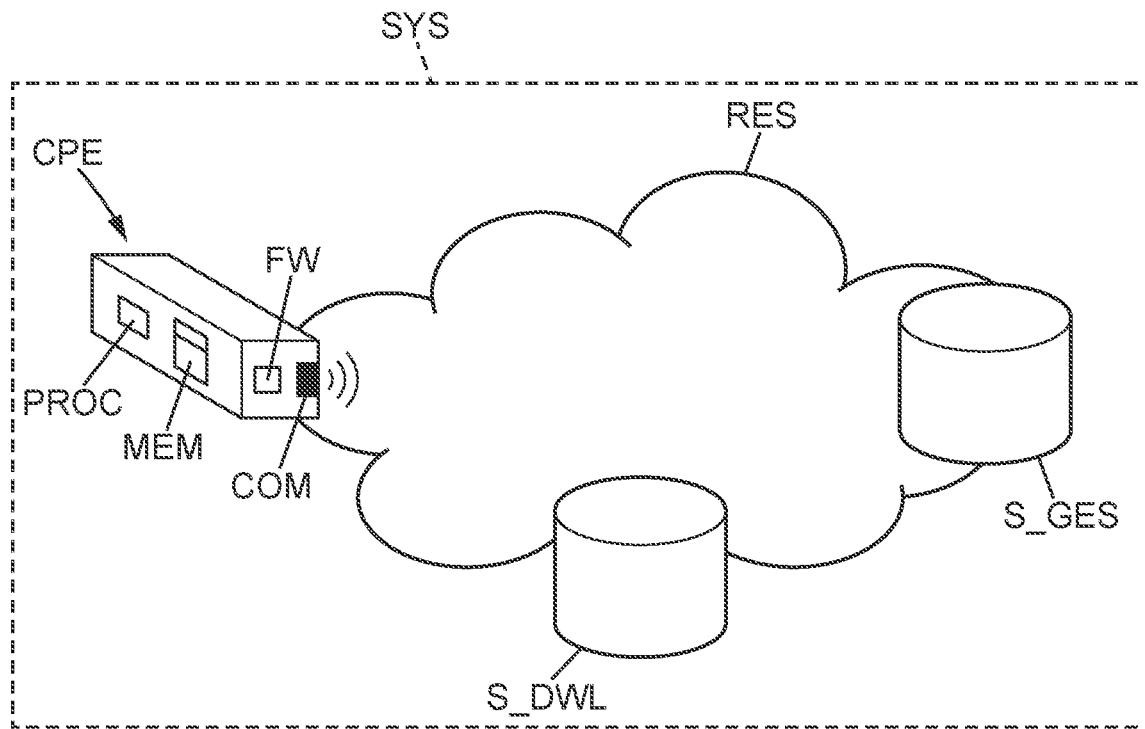
FIG. 1 illustrates a system according to the invention comprising an equipment for connection to a network, a remote management server for remotely managing a set of at least one equipment and a download server.

In the embodiment illustrated in FIG. 1, a single equipment CPE is shown. However, as explained in the remainder of the description, a plurality of equipments like the equipment CPE shown are able to connect to the network RES and to communicate with the management server S_GES and with the download server S_DWL.

The equipment CPE is configured to connect to the network RES. The network RES is for example a wide area network of Internet type. However, the network RES may also be a local area network or any other type of network. Typically, the equipment CPE is located near the user, for example a customer or business. For example, the equipment CPE is connected to the infrastructure of the operator with which the user has taken out a subscription, in a point of presence (also known by the acronym PoP), via a local loop. The equipment CPE is also known by the acronym CPE ("Customer-Premises Equipment" or "Customer-Provided Equipment").

The equipment CPE is for example a router connected by IP (acronym for "Internet Protocol") as part of an IP VPN (acronym for "Internet Protocol Virtual Private Network") service provided by an operator. The equipment CPE may also be a router connected by FR (acronym for "Frame Relay") as part of an FR VPN (acronym for "Frame Relay Virtual Private Network") service provided by an operator. Besides a router, the equipment CPE may refer to other equipments such as a landline telephone, a network switching center, a home platform commonly called an Internet box (also known by the acronym RG for "Residential Gateway"), a decoder box (also known by the term STB for "Set-Top box") or an analog terminal adapter.

Additionally, the equipment CPE is designed to generate data on connection to the network RES over a predetermined period of time. In other words, the equipment CPE is designed to generate and store data representative of active or passive use of the network RES by the user for a predetermined period of time.

For example, the connection data generated at the level of the equipment CPE relate to one or more times of connection of the equipment CPE to the network RES during the predetermined period of time. The connection data generated at the level of the equipment CPE may also relate to a quantity of data received by the equipment CPE from the network RES during the predetermined period of time.

Typically, if the user of the equipment CPE connects to the network RES at a specific time in the predetermined period of time and remains connected for a certain period of time, the connection data generated by the equipment CPE will relate to such information. Likewise, if this same user receives, via the equipment CPE, a quantity of data, expressed for example in bytes, in the predetermined period of time, the connection data generated by the equipment CPE may also relate to this information. More generally, the connection data generated by the equipment CPE are characteristic of the demand on or of the use of this equipment for a predetermined period of time. Such data make it possible to determine whether, during a given period of time, the equipment CPE has been used a lot to connect to the network RES or, conversely, if it has been used little or not at all to connect to the network RES.

As illustrated in FIG. 1, the equipment CPE comprises a firmware FW, a memory MEM, a processor PROC and a communication module COM.

The firmware FW is a computer program integrated into the equipment CPE and is designed to implement one or more functionalities within the equipment CPE. The firmware FW may also be called microcode, internal software, or embedded software. As explained in the remainder of the description, the present invention relates to a method allowing the firmware FW to be updated in order to modify an existing functionality or to integrate one or more new functionalities within the equipment CPE. It is understood here that the firmware FW allows the operation and the functionalities of the equipment CPE to be modified without modifying or replacing the computing and electronic components.

The memory MEM is designed to store instructions in the form of a computer program, the execution of which by the processor PROC results in the operation of the equipment CPE. For example, the instructions of the computer program corresponding to the firmware FW may be stored in the memory MEM. Advantageously, the memory MEM is further designed to store the connection data generated by the equipment CPE, and more precisely by the processor PROC. The memory MEM is, for example, a non-volatile memory. Alternatively, the memory MEM is a volatile memory.

Additionally, according to one embodiment, the memory MEM is further designed to store a set of predetermined profiles, such that the connection data generated at the level of the equipment CPE during a plurality of predetermined periods of time are associated with a profile of the set of predetermined profiles. In other words, it is possible to associate a pre-existing profile stored in the memory MEM with connection data generated by the equipment CPE.

The communication module COM is designed to communicate with the management server S_GES and the download server S_DWL. In the example illustrated in FIG. 1, the communication module COM communicates with the management server S_GES and the download server S_DWL via the network RES.

In particular, the communication module COM is further designed to send the connection data generated at the level of the equipment CPE to the management server S_GES. As explained above, the connection data may be, according to one embodiment, associated with a predetermined profile at the level of the memory MEM, the profile in question corresponding to connection data generated during a plurality of predetermined periods of time. In such an embodiment, the communication module COM is designed to transmit the obtained profile to the management server S_GES.

As explained in the remainder of the description, the software FW may be updated using download data sent by the download server S_DWL. The communication module COM is thus further configured to send a request to download the firmware FW update to the download server S_DWL. The communication module COM is further configured to receive the download data from the download server S_DWL.

According to one embodiment, the equipment CPE and the management server communicate according to the TR-069 communication protocol. In this case, the connection data generated by the equipment CPE are transmitted to the management server S_GES in an "inform request" for example. In addition, the connection data may be transmitted to the management server S_GES on other occasions during the TR-069 protocol sessions. For example, the connection data may be stored in a parameter of the data model, the management server S_GES being able to access data via a GetParameterValues request. The connection data may also be saved in a file, the uploading of which is controlled by the management server S_GES using requests (also called upload requests) sent by the management server S_GES during the sessions. The transmission of the connection data by the equipment CPE to the management server S_GES may therefore be performed in various ways during a TR-069 protocol session, the use of an inform request being one possible alternative among others.

Figure 2:
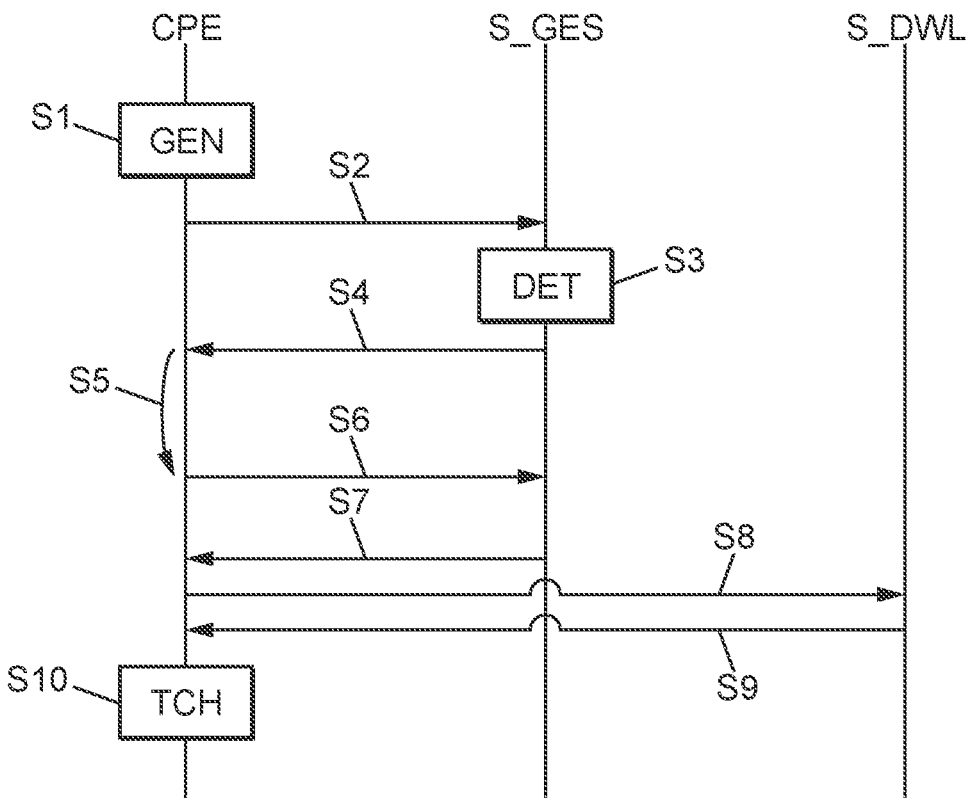
FIG. 2 illustrates a method for remotely managing a set of at least one equipment for connection to a network according to the invention.

The operation of the equipment CPE, and more specifically its interactions with the management server S_GES and the download server S_DWL, will be explained in more detail in the remainder of the description with reference to FIG. 2.

The management server S_GES is configured to remotely manage, or supervise, a set of at least one equipment for connection to the network RES with a view to updating the firmware FW within each equipment. In the example illustrated in FIG. 1, only one equipment, in this case the equipment CPE, is illustrated. However, those skilled in the art understand that the set of at least one equipment may comprise a plurality of equipments, therefore at least two equipments like the equipment CPE described above.

The management server S_GES is also called an auto-configuration server in the literature relating to this technical field.

The management server S_GES is further configured to determine a time slot, specific to each equipment CPE, for updating the firmware FW. The time slot specific to an equipment is determined according at least to the data on the connection of the equipment in question. In other words, in the example illustrated in FIG. 1, the management server S_GES is configured to determine, according at least to the connection data generated by the equipment CPE, the time slot during which it is most advantageous for the equipment CPE to update the firmware FW.

In one embodiment, the set of at least one equipment comprises a plurality of equipments, therefore at least two equipments like the equipment CPE. Advantageously, in such an embodiment, the time slot specific to an equipment, for example the equipment CPE, is further determined according to the data on the connection of the other equipments. In other words, for a given equipment of the set of equipments, the time slot, specific to this equipment, determined by the management server S_GES is determined according not only to the connection data specific to the equipment in question but also to connection data generated by the equipments distinct from the equipment in question.

For example, in the embodiment in which the data on the connection of an equipment that are generated during a plurality of predetermined periods of time are associated with a predetermined profile at the level of the equipment, the time slot, specific to this equipment, is determined according to the obtained profile of the equipment in question and also according to the respective profiles of the other equipments.

According to one embodiment, the time slot specific to an equipment is determined according to the capacities of the download server S_DWL relating to a maximum data transmission rate of the download server S_DWL.

The management server S_GES is further configured to transmit, to each equipment, information relating to the time slot specific to the equipment in question. The management server S_GES is also designed to transmit, to each equipment, information relating to an address of the download server S_DWL with a view to downloading the firmware FW update within each equipment in the time slot specific to each equipment.

The management server S_GES is for example a hardware server comprising a memory (not shown) designed to store the respective addresses of each equipment and communication means for sending/receiving data to/from each equipment.

The download server S_DWL is configured to send firmware FW update download data to each equipment sending a download request.

Those skilled in the art understand that the download server S_DWL allows the operator to which the user of the equipment CPE has subscribed to update or add functionalities to the equipment CPE.

In other words, as soon as it is connected to the network RES, the equipment CPE is able to enter into communication with the download server S_DWL in order for the firmware FW integrated into the equipment CPE to be able to be updated when the operator wishes.

In FIG. 1, the management server S_GES and the download server S_DWL appear as distinct servers with different roles. However, it will be understood that the management server S_GES and the download server S_DWL may be one and the same server performing the role of management server S_GES and of download server S_DWL.

A method for remotely managing a set of at least one equipment, such as the equipment CPE, for connection to the network RES will now be described with reference to FIG. 2.

In the context of the implementation of the method described below, the equipment CPE is located near the user, for example a customer or business. The user requires, during the day, the use of the equipment CPE to connect to the network RES. The network RES is for example a wide area network of Internet type. The network RES may also be a local area network or any other type of network. The equipment CPE comprises a firmware FW allowing one or more functionalities to be performed. The firmware FW is intended to be updated regularly in order to modify already existing functionalities or to incorporate new functionalities. This update is performed using the management server S_GES and the download server S_DWL.

Additionally, the method described below makes reference to the equipment CPE illustrated in FIG. 1. However, it is understood that this method is advantageously implemented for a plurality of equipments CPE connected to the network RES.

In a step S1, the equipment CPE generates data on connection to the network RES over a predetermined period of time. More specifically, these connection data are generated by the processor PROC of the equipment CPE. The information from this predetermined period of time is for example stored in the memory MEM of the equipment CPE.

As explained previously, the connection data generated at the level of the equipment CPE relate to one or more times of connection of the equipment CPE to the network RES during the predetermined period of time. The connection data generated at the level of the equipment CPE may also relate to a quantity of data received by the equipment CPE from the network RES during the predetermined period of time.

In other words, if the user of the equipment CPE connects to the network RES at a specific time in the predetermined period of time and remains connected for a certain period of time, the connection data generated by the equipment CPE will relate to such information. Likewise, if this same user receives, via the equipment CPE, a certain quantity of data in the predetermined period of time, the connection data generated by the equipment CPE may also relate to this information.

In one particular embodiment, the connection data generated by the equipment CPE during a plurality of predetermined periods of time are associated, within the memory MEM, with a predetermined profile. This predetermined profile is representative of the generated connection data.

Additionally, in one embodiment, each equipment, therefore the equipment CPE, and the management server S_GES communicate according to the TR-069 communication protocol. The connection data are then transmitted to the management server S_GES in an "inform request".

In a step S2, the equipment CPE transmits the generated connection data to the management server S_GES. For example, the equipment CPE transmits the generated data to the management server S_GES at regular time intervals. Advantageously, the time interval corresponds to the predetermined period of time. More precisely, the connection data are sent by the communication module COM of the equipment CPE.

Alternatively, in the embodiment in which the connection data generated during a plurality of predetermined periods of time are associated with a predetermined profile within the memory MEM of the equipment CPE, the equipment CPE transmits the associated profile to the equipment CPE. In other words, instead of transmitting the connection data each time they are generated, the equipment CPE stores, for example in the memory MEM, the connection data generated over several predetermined periods of time so as to decrease exchanges with the management server S_GES. Advantageously, the number of predetermined periods of time covers a duration longer than or equal to 24 hours.

In a step S3, the management server S_GES determines a time slot, specific to each equipment, and in particular the equipment CPE, for updating the firmware FW, the time slot specific to an equipment being dependent at least on the data on the connection of the equipment in question. Of course, in the embodiment in which an equipment transmits a profile associated with the generated connection data, the time slot specific to this equipment is determined according to this profile, and therefore to the generated connection data.

For example, in the case where the set of at least one equipment comprises at least two equipments, the time slot specific to one equipment may further be determined according to the data on the connection of the other equipments.

Advantageously, the time slot specific to an equipment is further determined according to the capacities of the download server relating to a maximum data transmission rate of the download server.

These two characteristics make it possible to take into account the capacities of the download server S_DWL, in particular when the latter is called upon to update the firmware of a large number of equipments like the equipment CPE.

In one or more embodiments, the management server S_GES uses a predetermined function to determine, for each equipment sending connection data, a provisional time slot according to the connection data generated and sent by the equipment CPE in question. The predetermined function makes it possible to assign, to a given potential time slot, a value of a parameter representative of the demand on or use of the equipment CPE in the time slot in question. In other words, the management platform calculates, for each equipment and for each time slot of a plurality of potential time slots, a value of the parameter representative of the use of a given equipment in a given time slot of the plurality of potential time slots. The duration of a potential time slot corresponds for example to the predetermined period of time. The duration of a potential time slot may also correspond to a plurality of predetermined periods of time.

The predetermined function has as input, for example, the data rate, expressed for example in bytes per second, received on average by the equipment in the given time slot. The data rate corresponds, for a given time slot, to the quantity of received data, expressed for example in bytes, divided by the duration of the given time slot, expressed for example in seconds.

Additionally, given that the time slot to be determined is the time slot during which the firmware FW will be updated, it is advantageous for the time slot to have a minimum duration. This minimum duration is for example dependent on the capacities of the download server S_DWL. This minimum duration is for example further dependent on the capacities of the equipment in question. Advantageously, this minimum duration is also dependent on the data on the connection of the other equipments when a plurality of equipments are concerned by the firmware FW update.

The predetermined function makes it possible, for a given equipment, to assign a value of the parameter representative of a use of the equipment to a plurality of given time slots, these time slots having a duration longer than or equal to a minimum duration dependent on the capacities of the download server S_DWL and, potentially, the capacities of the given equipment. For example, the lower the value associated with a given time slot, the less the given equipment is used, on average, in this time slot. This given time slot is then the most likely to be selected by the management server S_GES as the time slot specific to the given equipment for downloading the firmware FW update.

Thus, for each equipment, the management server S_GES selects the time slot associated with the lowest value. This time slot is called the "minimum-value time slot" in the remainder of the description. It is understood here that the management server S_GES selects, for each equipment, the time slot corresponding to the lowest use of the equipment, that is to say the minimum-value time slot.

As explained above, the management server S_GES and the download server are typically connected to a plurality of equipments like the equipment CPE. The set of respective minimum-value time slots of the equipments makes it possible to define a schedule (also called "planning" or "agenda") for updating all of the equipments. Advantageously, therefore, the time slot specific to an equipment is dependent not only on the data on the connection of the equipment in question but also on the data on the connection of the other equipments. Thus, the load may be decreased on the download server S_DWL.

Specifically, the respective minimum-value time slots of the equipments may overlap over the total period of time of the schedule. Thus, if the respective minimum-value time slots of two equipments overlap, this means that the download server S_DWL will potentially have to implement the firmware FW update of these two equipments at the same time in the time interval in which the two minimum-value time slots overlap. In such a case, there is therefore a particular demand on the download server S_DWL. The reasoning is of course the same when more than two minimum-value time slots overlap.

To decrease the load on the download server S_DWL while taking into account the different equipments and the various uses thereof, the management server S_GES may apply an additional criterion. For example, this criterion consists in determining, for a given time, the potential load on the download server S_DWL. The management server S_GES therefore determines, at each time of a plurality of times of the schedule, an index of potential demand for the download server S_DWL at the time in question. This index is determined according to the respective values of selected time slots, therefore the minimum-value time slots, including the time in question. In other words, the management server S_GES runs through the total period of time, that is to say all of the respective minimum-value time slots of the equipments, and determines, at each time of a plurality of times of the schedule, whether the corresponding index is higher than or equal to a predetermined threshold. For example, the index corresponds to the sum of the values of the minimum-value time slots containing the time in question. It is understood here that the times to be targeted in particular are those in which a plurality of minimum-value time slots overlap, which means that the updates of the equipments in question would have to be implemented by the download server S_DWL at the same time at least in these common times.

When this predetermined threshold is exceeded for a given time, this means that too large a number of minimum-value time slots overlap at least at this time so that joint updates of the firmware of the associated equipments are overly resource-intensive for the download server S_DWL.

Additionally, as explained above, another criterion to be verified may also be based on the capacities of the download server S_DWL. It is then possible to set a maximum number of time slots that may overlap at the same time in order to prevent the download server S_DWL from having to implement the updating of too many equipments at the same time. While the criterion mentioned above is based on the use of the equipments by the users, this one is oriented on the download server S_DWL-side and is directly linked to its own capacities, in particular the maximum data transmission rate.

Advantageously, when a criterion is not met, the management server S_GES may then replace the minimum-value time slot of one of the equipments involved with another time slot. For example, the minimum-value time slot of an equipment is replaced with a time slot the value of which, calculated using the predetermined function, is the lowest value higher than the minimum value. In other words, the second "best" time slot for a given equipment is selected. Next, the management server S_GES goes through the total period of time again while applying the criterion described above again and replacing the minimum-value period of time of one of the equipments with the new selected time slot. In other words, when the index is higher than a predetermined threshold at a given time of the schedule, one of the time slots comprising the time is replaced with another time slot, this other time slot being selected according to the value of the parameter representative of a use of the equipment in question in this other time slot.

When, for any time of this total period of time, the criterion is satisfied, namely that the load on the download server S_DWL never exceeds the predetermined threshold, then the obtained time slots are the time slots specific to the equipments.

In a step S4, the management server S_GES transmits, to each equipment, information relating to the time slot specific to each equipment. For example, the equipment CPE illustrated in FIG. 1 receives, from the management server S_GES, the information relating to the time slot, which is specific thereto, for updating the software FW. This information is for example received by the communication module COM and is stored in the memory MEM of the equipment CPE.

In a step S5, the equipment CPE is waiting for the start of the time slot for downloading the firmware FW update to be detected. Specifically, the time slot is characterized by an update start time and an update end time, so that the equipment CPE is waiting, in this step, for the update start time.

In a step S6, triggered by the detection of the update start time, therefore the start of the time slot specific to the equipment CPE, the equipment CPE sends, according to one particular embodiment, a request to open a session to the management server S_GES. More exactly, the request to open a session is sent by the communication module COM.

In a step S7, upon reception of the request to open a session sent by the equipment CPE, the management server S_GES sends, to the equipment CPE, information relating to an address of the download server S_DWL with a view to updating the firmware FW within the equipment CPE. This information relating to the address of the download server S_DWL is for example received by the communication module COM and stored in the memory MEM of the equipment CPE.

It should be specified here that the step of sending a request to open a session is optional and that the management server S_GES may directly transmit the information relating to the address of the download server S_DWL to the equipment CPE. This information may be, for example, sent with the information relating to the time slot specific to the equipment CPE or be sent before.

In a step S8, the equipment CPE sends a request to download the firmware FW update to the download server S_DWL associated with the received address. This download request is for example sent by the communication module COM and comprises the address of the download server so that the request may be routed to the download server S_DWL.

In a step S9, upon reception of the download request sent by the equipment CPE, the download server S_DWL sends firmware update download data to each equipment sending a download request. In particular here, the download server S_DWL sends the download data to the equipment CPE for downloading the firmware FW update. These download data are for example received by the communication module COM.

Lastly, in a step S10, the equipment CPE downloads the firmware FW update. The update is implemented in the time slot specific to the equipment CPE. More generally, the firmware update is downloaded within each equipment receiving the download data.

The invention has several advantages.

First of all, determining a time slot for downloading the firmware update specific to each equipment connected to the network makes it possible to decrease the load on the download server. Thus, the updating of the respective firmwares of the numerous equipments may be spread out over time so that the capacities of the download server are less stretched.

In addition, determining a time slot specific to each equipment makes it possible to personalize the firmware update procedure and, advantageously, to mobilize the equipment only in a time slot during which the equipment is usually used little or not at all by a user.

The invention claimed is:

1. A method of remotely managing a set of at least one equipment for connection to a network in order to update a firmware of each equipment, the method comprising:
    generating, at a level of each equipment, data regarding the connection of the equipment to the network over a predetermined period of time,
    determining, at a level of a remote management server, a time slot, specific to each equipment, for updating the firmware, the time slot specific to an equipment being dependent at least on the data regarding the connection of the equipment,
    transmitting, to each equipment, information relating to the time slot specific to the equipment,
    transmitting, to each equipment, information relating to an address of a download server for the purpose of updating the firmware within the equipment,
    sending, from each equipment, a request to download the firmware update to the download server associated with the received address,
    sending, from the download server, firmware update download data to each equipment sending a download request, and downloading, to each equipment receiving the download data, the firmware update in the time slot specific to the equipment.

2. The method of claim 1, wherein the connection data generated by an equipment are transmitted at regular time intervals to the management server, each time interval corresponding to the predetermined period of time.

3. The method of claim 1, wherein the connection data generated by an equipment during a plurality of predetermined periods of time are associated with a profile at a level of the equipment, the profile being selected in a memory storing profiles that are predetermined before being transmitted to the management server.

4. The method of claim 1, wherein the transmission to an equipment of the information relating to the address of the download server is consecutive to the transmission, from the equipment, of a request to open a session to the management server, the request to open a session being sent upon detection, by the equipment, of the start of the time slot specific to the equipment.

5. The method of claim 1, wherein each equipment and the management server communicate according to the TR-069 communication protocol, the connection data being transmitted to the management server in an "inform request".

6. The method of claim 1, wherein the connection data generated at the level of an equipment relate to one or more times of connection of the equipment to the network during the predetermined period of time.

7. The method of claim 1, wherein the connection data generated at a level of an equipment relate to a quantity of data received by the equipment from the network during the predetermined period of time.

8. The method of claim 1, wherein the time slot specific to an equipment is determined according to the capacities of the download server relating to a maximum data transmission rate of the download server.

9. The method of claim 1, the set of at least one equipment comprising at least two equipments, wherein the time slot specific to one equipment is further determined according to the data on the connection of the one or more other equipments.

10. The method of claim 9, wherein the determination of the time slot for updating the firmware specific to each equipment comprises:
calculating, for each equipment and for each time slot of a plurality of potential time slots, a value of a parameter representative of a use of the equipment in the time slot in question according to the connection data generated by the equipment,
selecting, for each equipment, the time slot corresponding to the lowest use of the equipment, the set of the selected time slots forming a schedule for updating all of the equipments,
determining, at each time of a plurality of times of the schedule, an index of potential demand for the download server at the time, the index being dependent on the respective values of selected time slots comprising the time, and
upon a determination that the index is higher than a predetermined threshold at a given time of the schedule, replacing one of the time slots comprising the time with another time slot, the other time slot being selected according to the value of the parameter representative of a use of the equipment in question in the other time slot.

11. The method of claim 10, wherein the value of the parameter representative of a use of an equipment in a given time slot is calculated according at least to the quantity of data received by the equipment in the time slot.

12. A non-transitory computer-readable medium comprising instructions which, when executed by at least one processor, cause the at least one processor to implement the method of claim 1.

13. A system comprising:
a set of at least one of an equipment for connection to a network the equipment comprising a firmware, a processor, and a communication module, the equipment configured to:
generate data regarding the connection of the equipment to the network over a predetermined period of time,
receive information relating to a time slot, specific to the equipment, for downloading a firmware update to the equipment,
receive information relating to an address of a download server for the purpose of downloading the firmware update,
send a request to download the firmware update to the download server associated with the received address,
receive, from the download server, firmware update download data, and
download the firmware update in the time slot specific to the equipment; and
a remote management server for remotely managing the set of at least one of the equipment for connection to the network in order to update a firmware of each equipment, the management server comprising a processor and configured to:
receive, from each equipment, data regarding the connection of the equipment to the network over a predetermined period of time,
determine a time slot, specific to each equipment, for updating the firmware, the time slot specific to an equipment being dependent at least on the data regarding the connection of the equipment,
transmit, to each equipment, information relating to the time slot specific to the equipment, and
transmit, to each equipment, information relating to an address of a download server for the purpose of downloading the firmware update to each equipment in the time slot specific to each equipment.

14. The system of claim 13, further comprising a download server configured to, upon receiving a request to download the firmware update sent by an equipment of the set of at least one equipment, send firmware update download data to the equipment.

* * * * *